(12) United States Patent
Liu et al.

(10) Patent No.: US 12,162,170 B2
(45) Date of Patent: Dec. 10, 2024

(54) METHOD AND DEVICE FOR COLLABORATIVE SERVO CONTROL OF MOTION VISION OF ROBOT IN UNCALIBRATED AGRICULTURAL SCENE

(71) Applicant: SHANGHAI JIAO TONG UNIVERSITY, Shanghai (CN)

(72) Inventors: Chengliang Liu, Shanghai (CN); Liang Gong, Shanghai (CN); Xudong Li, Shanghai (CN); Tao Wang, Shanghai (CN); Xiaoye Shen, Shanghai (CN); Chenhui Lin, Shanghai (CN); Jianfeng Tao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 409 days.

(21) Appl. No.: 17/602,903

(22) PCT Filed: Nov. 18, 2019

(86) PCT No.: PCT/CN2019/119079
§ 371 (c)(1),
(2) Date: Oct. 11, 2021

(87) PCT Pub. No.: WO2020/207017
PCT Pub. Date: Oct. 15, 2020

(65) Prior Publication Data
US 2022/0193914 A1 Jun. 23, 2022

(30) Foreign Application Priority Data
Apr. 11, 2019 (CN) .......................... 201910289751.2

(51) Int. Cl.
*B25J 9/16* (2006.01)
*A01B 63/00* (2006.01)
(Continued)

(52) U.S. Cl.
CPC ........... *B25J 9/1697* (2013.01); *A01B 63/002* (2013.01); *B25J 9/1605* (2013.01); *B25J 9/161* (2013.01);
(Continued)

(58) Field of Classification Search
CPC ... A01B 63/002; A01M 7/0089; B25J 9/1697; B25J 9/1605; B25J 9/161; B25J 9/1612;
(Continued)

(56) References Cited

U.S. PATENT DOCUMENTS 10,792,810 B1 * 10/2020 Beckman ................. B25J 9/163
2009/0129628 A1 * 5/2009 Mirbach ................... G06T 7/73
382/104

(Continued)

FOREIGN PATENT DOCUMENTS

CN 105353772 A 2/2016
CN 106041941 A 10/2016
(Continued)

OTHER PUBLICATIONS

CN-108271531-A translation (Year: 2018).*
(Continued)

*Primary Examiner* — Kyle T Johnson
(74) *Attorney, Agent, or Firm* — Bayramoglu Law Offices LLC

(57) ABSTRACT

A device and method for collaborative servo control of motion vision of a robot in an uncalibrated agricultural scene is provided. The device includes a robot arm, a to-be-gripped target object, an image sensor and a control module. An end of a robot arm is provided with a mechanical gripper, and a to-be-gripped target object is within a grip range of the robot arm. A control module drives the mechanical gripper to grip the to-be-gripped target object, and controls an image sensor to perform image sampling on a process of gripping the (Continued)

to-be-gripped target object by the robot arm. The image sensor sends sampled image data to the control module. The device does not need to perform precise spatial calibration on the to-be-gripped target object and the related environment in the scene. The robot arm is guided to complete the gripping task according to trained networks.

10 Claims, 3 Drawing Sheets

(51) Int. Cl.
*B25J 13/08* (2006.01)
*G05B 19/4155* (2006.01)
*G06T 7/70* (2017.01)

(52) U.S. Cl.
CPC ............. *B25J 9/1612* (2013.01); *B25J 9/163* (2013.01); *B25J 9/1661* (2013.01); *B25J 13/08* (2013.01); *G05B 19/4155* (2013.01); *G06T 7/70* (2017.01); *G05B 2219/40269* (2013.01)

(58) Field of Classification Search
CPC . B25J 9/163; B25J 9/1661; B25J 13/08; B25J 13/087; B25J 15/0253; B25J 15/08; G05B 19/4155; G05B 2219/40269; G06T 7/70; G06T 2207/20081; G06T 2207/20084; G06T 7/73
See application file for complete search history.

(56) References Cited

U.S. PATENT DOCUMENTS

| | | | | |
|---|---|---|---|---|
| 2017/0157767 A1* | 6/2017 | Takamizawa | .......... | B25J 9/1697 |
| 2018/0099408 A1* | 4/2018 | Shibata | ................. | B25J 9/1697 |
| 2018/0147723 A1* | 5/2018 | Vijayanarasimhan | ....................... G06N 3/008 | |
| 2018/0243914 A1 | 8/2018 | Wang et al. | | |
| 2019/0291277 A1* | 9/2019 | Oleynik | ................. | B25J 9/1669 |
| 2021/0107142 A1* | 4/2021 | Solowjow | ................ | B25J 9/163 |
| 2022/0147053 A1* | 5/2022 | Lin | ......................... | H04W 4/40 |
| 2022/0189025 A1* | 6/2022 | Sawada | ............. | G06Q 10/0637 |
| 2022/0193914 A1* | 6/2022 | Liu | ........................... | G06T 7/70 |
| 2022/0339787 A1* | 10/2022 | Kaspar | ..................... | B25J 9/161 |
| 2023/0041258 A1* | 2/2023 | Okizaki | ................. | B25J 11/005 |

FOREIGN PATENT DOCUMENTS

| | | | | | |
|---|---|---|---|---|---|
| CN | 107451602 A | | 12/2017 | | |
| CN | 107481247 A | | 12/2017 | | |
| CN | 108171748 A | | 6/2018 | | |
| CN | 108227689 A | | 6/2018 | | |
| CN | 108271531 A | * | 7/2018 | ............. | A01D 46/30 |
| CN | 108656107 A | | 10/2018 | | |
| CN | 109015640 A | * | 12/2018 | ................ | B25J 9/16 |
| CN | 109074513 A | | 12/2018 | | |
| CN | 109153123 A | | 1/2019 | | |
| CN | 109443382 A | | 3/2019 | | |
| CN | 109531584 A | | 3/2019 | | |
| CN | 110000785 A | | 7/2019 | | |
| EP | 2255930 A1 | | 12/2010 | | |

OTHER PUBLICATIONS

CN-109015640-A translation (Year: 2018).*
Feng Qingchun, et al., Fruit bunch measurement method for cherry tomato based on visual servo, Transactions of the Chinese Society of Agricultural Engineering, 2015, pp. 206-212, vol. 31 No. 16.

* cited by examiner

METHOD AND DEVICE FOR COLLABORATIVE SERVO CONTROL OF MOTION VISION OF ROBOT IN UNCALIBRATED AGRICULTURAL SCENE

CROSS REFERENCE TO THE RELATED APPLICATIONS

This application is the national phase entry of International Application No. PCT/CN2019/119079, filed on Nov. 18, 2019, which is based upon and claims priority to Chinese Patent Application No. 201910289751.2, filed on Apr. 11, 2019, the entire contents of which are incorporated herein by reference.

TECHNICAL FIELD

The present invention relates to the field of robots, and more particularly, to a method and device for collaborative servo control of motion vision of a robot in an uncalibrated agricultural scene.

BACKGROUND

As a precise and efficient execution machine, robots have been widely applied in military, medical, manufacturing and other fields. Robots can achieve different functions in industrial scenes due to the integration of various technologies such as electronics, sensing and control. In order to meet more complex and variable task requirements and improve the performance and intelligence of robots, the concept of intelligent robots has been proposed. Such intelligent robots have adaptive and self-learning functions, which apply learning control algorithms such as reinforcement learning (RL) control, programming and pattern recognition, and intelligent perception technologies such as image and vision computing or deep neural network (DNN). The intelligent robots guarantee the work accuracy and robustness while improving their environmental adaptability and task flexibility.

Chinese patent document CN106041941A, published on Oct. 26, 2016, discloses a method and device for trajectory programming of an industrial robot arm, which realizes a technology of driving an industrial robot arm. This technology constructs a coordinate system and a workspace for each joint of a selective compliance assembly robot arm (SCARA), and optimizes a velocity programming process of the robot arm by pre-calculating an intersection of a ray in an input control direction and a boundary of the workspace. This technology, however, needs to accurately calibrate the scene to acquire the spatial coordinates of a target end point, and then perform patterned trajectory programming drive. It has high requirements for the calibration device and technology, has poor adaptability to different scenes, and is especially unable to adapt to the unstructured agricultural scenes that are complex and changeable.

Chinese patent document CN105353772A, published on Feb. 24, 2016, discloses a visual servo control method for unmanned aerial vehicle (UAV) positioning and tracking. This technology acquires the coordinate system data of the earth, an UAV, a camera and an image by mounting a positioning device, an inertial measurement unit and the camera on the UAV, and controls a target object shot by the UAV to be located in the center of the image by calculating a relative transformation relationship between the coordinate systems. This technology combines vision sensing to realize visual servo-based UAV control. However, this technology can only be used for target attitude programming of UAVs in simple scenes, and it is hard to be applied to the field of agricultural robots and give an execution policy in uncalibrated agricultural scenes.

SUMMARY

An objective of the present invention is to provide a method and device for collaborative servo control of motion vision of a robot in an uncalibrated agricultural scene, which has low requirements for space perception equipment and high environmental adaptability.

In order to solve the above problem, the present invention provides a device for collaborative servo control of motion vision of a robot in an uncalibrated agricultural scene. The device includes: a robot arm, a to-be-gripped target object, an image sensor and a control module, where an end of the robot arm is provided with a mechanical gripper; the to-be-gripped target object is within a grip range of the robot arm; the control module is electrically connected to the robot arm and the image sensor, respectively; the control module drives the mechanical gripper to grip the to-be-gripped target object, and controls the image sensor to perform image sampling on a process of gripping the to-be-gripped target object by the robot arm; and the image sensor sends sampled image data to the control module.

Preferably, the robot arm may be a six-degree-of-freedom robot arm.

The present invention further provides a method for collaborative servo control of motion vision of a robot in an uncalibrated agricultural scene. The method includes:
constructing a scene space feature vector acquisition network, and acquiring a scene space feature vector;
acquiring a demonstrated action sample;
constructing an inverse reinforcement reward policy network;
subjecting the inverse reinforcement reward policy network to a transfer training; and
acquiring, based on a visual feature extraction network and the inverse reinforcement reward policy network, a forward-guided programming result by using a guided policy search (GPS) algorithm.

Preferably, the scene space feature vector acquisition network may be a vision-based convolutional neural network.

Preferably, the step of acquiring the scene space feature vector may specifically include:
performing, by an image sensor, image sampling on a process of gripping a to-be-gripped target object by a robot arm, and extracting red, green and blue (RGB) image information; and
inputting the image information into the scene space feature vector acquisition network to output the scene space feature vector.

Preferably, the step of acquiring the demonstrated action sample may specifically include:
pulling the robot arm to complete gripping the to-be-gripped target object, and acquiring demonstrated gripping action data of a single demonstrated gripping;
driving the robot arm to simulate the demonstrated gripping action data and autonomously complete an action of gripping the to-be-gripped target object, and acquiring image feature data of a demonstrated gripping scene through shooting; and
integrating the demonstrated gripping action data and the image feature data of the demonstrated gripping scene to obtain the demonstrated action sample.

Preferably, the step of constructing the inverse reinforcement reward policy network may specifically include:
- constructing the inverse reinforcement reward policy network for fitting and representing a reward;
- generating a simulation parameter through a simulation domain randomization algorithm;
- programming and simulating a virtual gripping action by using a robot operating system (ROS) programming library, and obtaining a simulated gripping path through sampling; and
- subjecting the inverse reinforcement reward policy network to a simulation pre-training.

Preferably, the transfer training of the inverse reinforcement reward policy network may include: performing optimization training on the inverse reinforcement reward policy network by using the demonstrated action sample.

Compared with the prior art, the present invention has the following beneficial effects:
1. The embodiments of the present invention do not need to perform precise spatial calibration on the to-be-gripped target object and the related environment in the scene. The robot arm is guided to complete the gripping task according to the trained networks, which have low requirements for space perception equipment, high environmental adaptability, and can be applied to a variety of tasks.
2. The embodiments of the present invention construct the scene space feature vector acquisition network for acquiring a scene feature, simulate gripping through the domain randomization algorithm in the simulation environment, and use the simulation data to pre-train of the inverse reinforcement reward policy network. The scene space feature vector acquisition network and the inverse reinforcement reward policy network are respectively pre-trained, which decouples the traditional complex servo controls of vision and motion and reduces the complexity of network training.
3. The embodiments of the present invention can quickly generate a large amount of training data through the domain randomization algorithm, which reduces the number of demonstrations of a demonstrator, and improves the training effect of the networks within limited time and resources.

Certainly, the implementation of any product in the present invention does not necessarily need to achieve all of the above advantages.

BRIEF DESCRIPTION OF THE DRAWINGS

In order to describe the technical solutions in the embodiments of the present invention more clearly, the drawings required to describe the embodiments are briefly described below. Apparently, the drawings described below are only some embodiments of the present invention. Those skilled in the art may further obtain other drawings based on these drawings without creative efforts. In the drawings.

DETAILED DESCRIPTION OF THE EMBODIMENTS

The method and device for collaborative servo control of motion vision of a robot in an uncalibrated agricultural scene provided by the present invention are described in detail below with reference to the drawings. The embodiments are implemented based on the technical solutions of the present invention. Although the detailed implementations and specific operation procedures are described, the protection scope of the present invention is not limited to the embodiments. Those skilled in the art can modify and polish the present invention without changing the spirit and content of the present invention.

In the embodiments of the present invention, a scene space feature vector acquisition network, that is, a vision-based convolutional neural network, is constructed to extract spatial features of a scene and a to-be-gripped target object. An inverse reinforcement reward policy network is constructed to indirectly describe a possible driven gripping policy. Meanwhile, gripping is simulated through a domain randomization algorithm in a simulation environment, and simulation data is used to pre-train the inverse reinforcement reward policy network. The scene space feature vector acquisition network and the inverse reinforcement reward policy network are respectively pre-trained, which decouples the traditional complex servo control of vision and motion and reduces the complexity of network training. The domain randomization algorithm can be used to quickly generate a large amount of training data, which reduces the number of manual demonstrations, and improves the training effect of the networks within limited time and resources. Finally, through the integration of a real scene and demonstration data, the system network is modified to adapt to the real scene and task. After the network trainings are completed, a programming result is given through a guided policy search (GPS) algorithm. In the final application process, there is no need for precise spatial calibration on the to-be-gripped target object and the related environment in the scene. It is only necessary to guide the robot arm to complete the gripping task according to the trained networks, which have low requirements for space perception equipment, high environmental adaptability, and can be applied to a variety of tasks.

Embodiment 1

Figure 1:
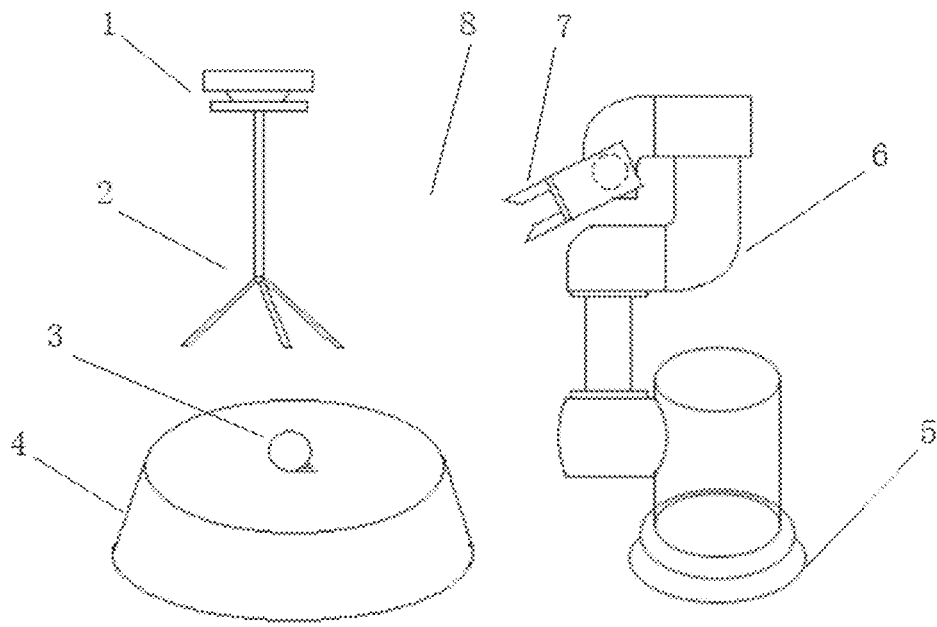
FIG. 1 is a view illustrating a structure of a device for collaborative servo control of motion vision of a robot in an uncalibrated agricultural scene according to an embodiment of the present invention.

This embodiment of the present invention provides a device for collaborative servo control of motion vision of a robot in an uncalibrated agricultural scene. The device includes: a robot arm, a to-be-gripped target object, an image sensor and a control module, as shown in FIG. 1.

The robot arm is a UR5 robot arm 6, and the UR5 robot arm 6 is a six-degree-of-freedom robot arm. A mechanical gripper 7 is provided at an end of the robot arm. The mechanical gripper 7 is able to complete the gripping of a to-be-gripped target object 3 through clamping and releasing motions. The UR5 robot arm 6 is fixed through a base frame 5 in a scene 8.

The to-be-gripped target object 3 is preferably a fruit or a vegetable, for example, a tomato, which is placed on a working platform 4. The working platform 4 is a stable working plane with a certain height, such as a desk. The working platform 4 is placed in the scene 8. The to-be-gripped target object 3 is within a grip range of the UR5 robot arm 6.

The image sensor is a kinect image sensor 1, specifically a Kinect 2.0 image sensor. The Kinect image sensor 1 is fixed on a kinect mounting bracket 2. The Kinect mounting bracket 2 is a device that is able to fix the kinect image sensor 1 at a certain height, and is preferably constructed using an aluminum profile. The kinect mounting bracket 2 is placed beside the UR5 robot arm 6 and the to-be-gripped target object 3. The kinect image sensor 1 is able to shoot the UR5 robot arm 6, the to-be-gripped target object 3 and the scene 8.

The control module is a Jetson TX1 control board 9. The Jetson TX1 control board 9 is electrically connected to the UR5 robot arm 6 and the kinect image sensor 1, respectively. The Jetson TX1 control board 9 drives the UR5 robot arm 6 to grip the to-be-gripped target object 3 through the mechanical gripper 7, and controls the kinect image sensor 1 to perform image sampling on a process of the UR5 robot arm 6 gripping the to-be-gripped target object 3. The kinect image sensor 1 sends sampled image data to the Jetson TX1 control board 9.

Figure 2:
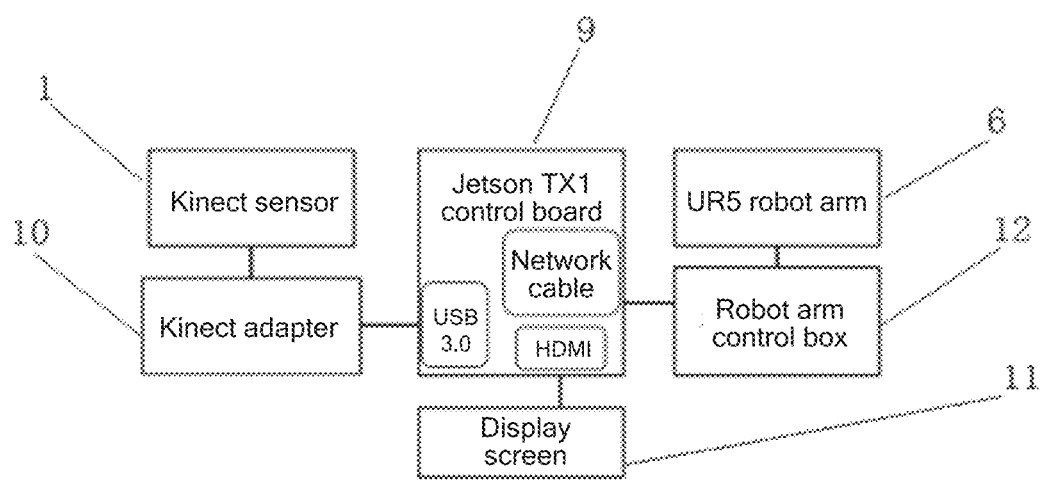
FIG. 2 is a view illustrating hardware connection of the device for collaborative servo control of motion vision of a robot in an uncalibrated agricultural scene according to an embodiment of the present invention.

Specifically, referring to FIG. 2, the Kinect image sensor 1 converts an interface to a USB3.0 interface through a Kinect adapter 10. The Kinect adapter 10 is connected to the Jetson TX1 control board 9 via USB3.0. The UR5 robot arm 6 obtains power by connecting a robot arm control box 12. The robot arm control box 12 and the Jetson TX1 control board 9 are connected by a network cable. The Jetson TX1 control board 9 inputs a robot arm control signal to the robot arm control box 12 through a network cable interface.

Preferably, the Jetson TX1 control board 9 is connected to a display screen 11 through a high-definition multimedia interface (HDMI) interface.

Figure 3:
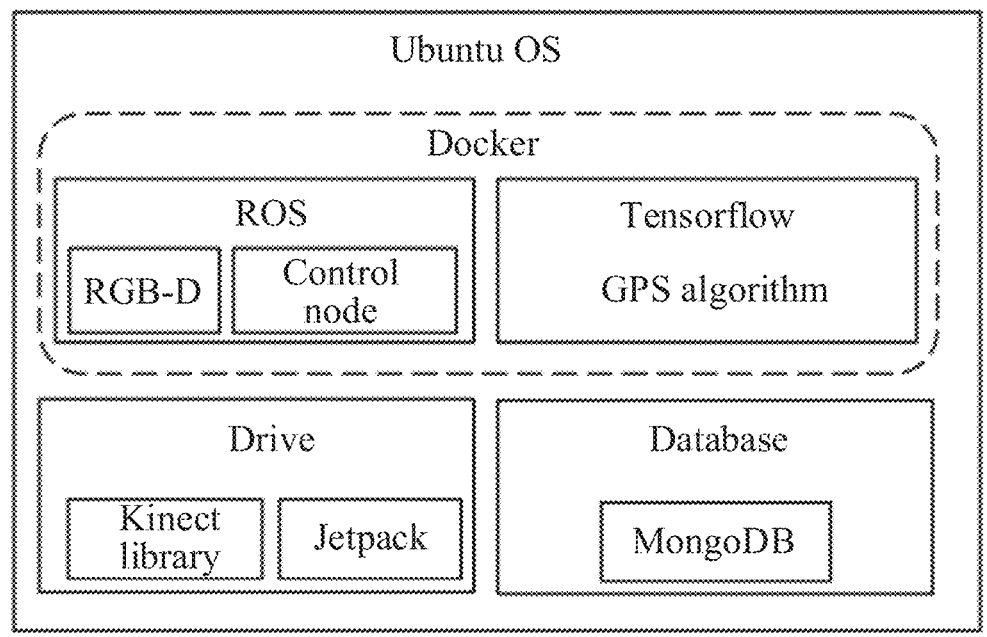
FIG. 3 is a view illustrating a software hierarchy of the device for collaborative servo control of motion vision of a robot in an uncalibrated agricultural scene according to an embodiment of the present invention.

Further, referring to FIG. 3, an Ubuntu operating system and drive components are installed in the Jetson TX1 control board 9. Other software is installed in the Jetson TX1 control board 9 through a Jetpack developer kit. A Kinect support library is installed to enable the control module, i.e., the Jetson TX1 control board 9 to drive the Kinect image sensor, and use relevant image processing tools and algorithms. By installing a python dependency library and MongoDB database software, an embedded database is built in the Jetson TX1 control board 9 to save relevant data for subsequent trainings. Docker container engine is installed to create an independent software operating environment, and the robot operating system (ROS) and Tensorflow framework are installed in the Docker container. In this way, the Jetson TX1 control board 9 is provided with a container engine with a complete development environment, which can be quickly transferred to other hardware systems.

The ROS includes algorithm nodes for red, green and blue-depth (RGB-D) sampling processing and sampling control nodes for the UR5 robot arm. The Tensorflow framework includes a GPS algorithm control program, as well as trained visual space feature extraction and reinforcement reward policy networks.

Embodiment 2

Figure 4:
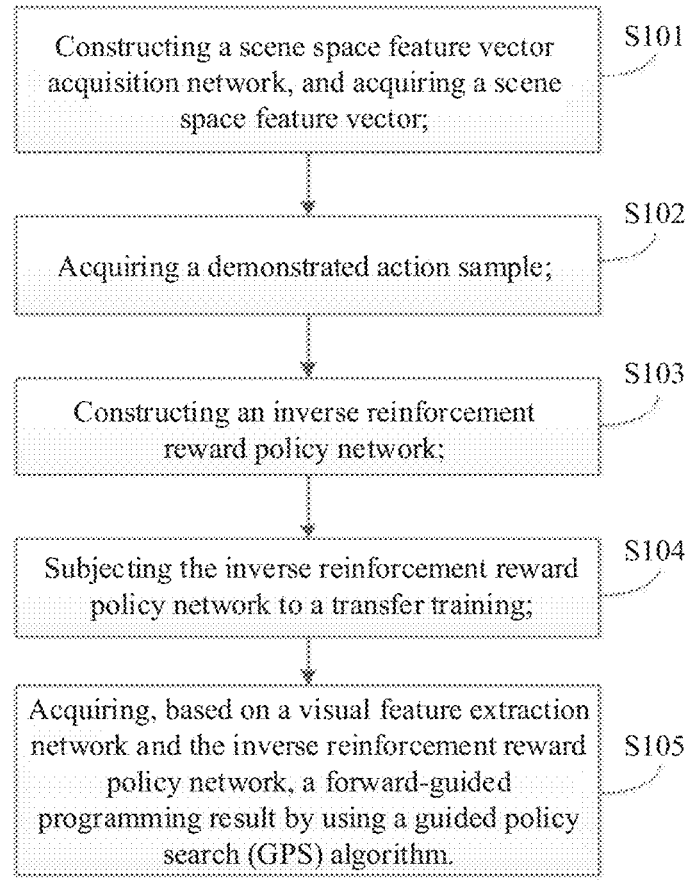
FIG. 4 is a flowchart of a method for collaborative servo control of motion vision of a robot in an uncalibrated agricultural scene according to an embodiment of the present invention.

This embodiment of the present invention provides a method for collaborative servo control of motion vision of a robot in an uncalibrated agricultural scene, which is based on the device for collaborative servo control of motion vision of a robot in an uncalibrated agricultural scene according to Embodiment 1. Referring to FIG. 4, the method includes the following steps:

S101: Construct a scene space feature vector acquisition network, and acquire a scene space feature vector.

Figure 5:
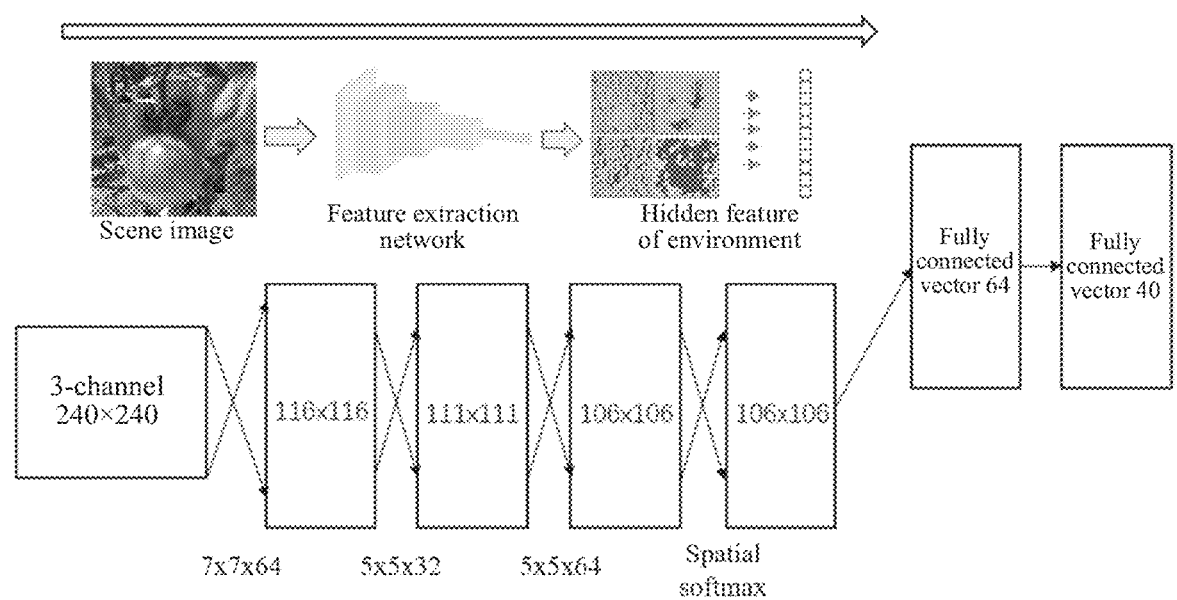
FIG. 5 is a view illustrating a structure of a scene space feature vector acquisition network according to an embodiment of the present invention.

In this embodiment, the scene space feature vector acquisition network is a vision-based convolutional neural network. Referring to FIG. 5, the transfer of the scene space feature vector acquisition network uses the first five layers of CIFAR-1000 VGG16 as an image feature extraction network, which is a convolutional neural network.

A convolutional layer of the convolutional neural network is calculated as follows:

$$x_j^l = f\left(\sum_{i \in M_j} x_i^{l-1} k_{ij}^l + b_j^l\right)$$

where, $x_j^l$ represents a j-th feature map of an l-th layer;

$$\sum_{i \in M_j} x_i^{l-1} k_{ij}^l$$

represents a convolution operation and summation for a related feature map $x_i^{l-1}$ of l−1 layers and a j-th convolution kernel $k_{ij}^l$ of the l-th layer; $b_j^l$ is an offset parameter supplementing the j-th feature map of the l-th layer; and f( . . . ) is an excitation function, which is used to generate an output from a convolution result on a right side of the equation.

A pooling layer of the convolutional neural network is calculated as follows:

$$x_j^l = f(\beta_j^l \mathrm{down}(x_j^{l-1}))$$

where, $x_j^l$ represents the j-th feature map of the l-th layer; $\beta_j^l$ represents a weight; in a 2×2 pooling process in this embodiment, $\beta_j^l$ is taken as ¼; down( . . . ) is a down-sampling function; f( . . . ) is an excitation function, which is used to generate an output from a pooling result on a right side of the equation.

In this embodiment, the structure of the scene space feature vector acquisition network used is as follows:

TABLE 1

| No. | Name | Parameter |
|---|---|---|
| 1 | Input | 240 × 240 × 3 |
| 2 | conv1 + pool1 | Convolution: 7 × 7 × 64, sliding step 1, pooling: 2 × 2, sliding step 1 |
| 3 | conv2 + pool2 | Convolution: 5 × 5 × 32, sliding step 1, pooling: 2 × 2, sliding step 1 |
| 4 | conv3 + pool3 | Convolution: 5 × 5 × 64, sliding step 1, pooling: 2 × 2, sliding step 1 |
| 5 | Softmax | 32 |
| 6 | Fully connected 5 | 64 |
| 7 | Fully connected 6 | 64 |
| 8 | Fully connected 7 | 40 |

In this embodiment, the Jetson TX1 control board 9 controls the kinect image sensor 1 to shoot and gripping scene and extract RGB image information to acquire a 240×240×3 3-channel RGB image. The image data is input into the scene space feature vector acquisition network, and the scene space feature vector acquisition network finally outputs a 40-dimensional sparse vector F, which is used to represent a scene image feature.

S102: Acquire a demonstrated action sample.

In this embodiment, the acquiring the demonstrated action sample includes:

S1021: Pull the robot arm to complete gripping of a to-be-gripped target object, and acquire demonstrated gripping action data of a single demonstrated gripping.

The UR5 robot arm 6 is manually pulled to run through a demonstrated gripping path of the UR5 robot arm 6, such that the mechanical gripper 7 at the end of the UR5 robot arm 6 reaches a position where the to-be-gripped target object 3 can be directly gripped. In the gripping process, the Jetson TX1 control board 9 continuously samples state information of joints in motion at a frequency f and acquires the demonstrated gripping action data of a single demonstrated gripping.

In this embodiment, the UR5 robot arm 6 includes six-degree-of-freedom joints. The state information of each joint is denoted as $S_{robot}(\theta_i, \omega_i, a_i, v_i, a_i', x_i)$, including: a rotation $\theta_i$, a velocity $\omega_i$, an angular acceleration $a_i$, a space motion velocity $v_i$ of a joint node center, a space motion acceleration $a_i'$ of the joint node center and a displacement relative to an initial position $x_i$. $S_{robot}^{direct}(\theta_i, \omega_i)$ can be directly acquired, including the rotation $\theta_i$ and the velocity $\omega_i$, and an initial zero point of the joint is $\theta_i=0$, $\omega_i=0$. $S_{robot}^{indirect}(a_i, v_i, a_i', x_i)$ is acquired indirectly. The joint state is calculated based on $S_{robot}^{direct}(\theta_i, \omega_i)$ and a sampling step T=1/f, f being the sampling frequency.

During the gripping process, the UR5 robot arm drive node program continuously samples the state information of the joints in motion at the frequency f. In each sample, the UR5 robot arm drive node program acquires the joint state information $S_{robot}^{direct}(\theta_i, \omega_i)$ that can be directly acquired, and synchronously calculates the joint state information $S_{robot}^{indirect}(a_i, v_i, a_i', x_i)$ that can be indirectly acquired. The $S_{robot}^{direct}(\theta_i, \omega_i)$ and $S_{robot}^{indirect}(a_i, v_i, a_i', x_i)$ in a single sampling are combined into a single joint state information sampling result $S_{robot}(\theta_i, \omega_i, a_i, v_i, a_i', x_i)$.

Then, all joint state information sampling results $S_{robot}(\theta_i, \omega_i, a_i, v_i, a_i', x_i)$ acquired through multiple samplings during the gripping process are arranged in the order of sampling time to form a continuous joint state information data sequence. This sequence serves as the demonstrated gripping action data of a single demonstrated gripping.

S1022: Drive the robot arm to simulate the demonstrated gripping action data and autonomously complete an action of gripping the to-be-gripped target object, and acquire image feature data of a demonstrated gripping scene through shooting.

After a single demonstrated action is completed, the personnel leaves the scene. Based on the state information of the six-degree-of-freedom joints of the UR5 robot arm 6 included in the demonstrated gripping action data, the Jetson TX1 control board 9 drives the UR5 robot arm 6 to simulate the demonstrated process to complete a single action of gripping the to-be-gripped target object 3. Meanwhile, the Jetson TX1 control board 9 drives the kinect image sensor 1 to perform image sampling on the gripping process at the frequency of f, so as to acquire the image feature data of a single gripping in the demonstrated gripping scene.

S1023: Integrate the demonstrated gripping action data and the image feature data of the demonstrated gripping scene to obtain the demonstrated action sample.

The demonstrated gripping action data, the image feature data of the demonstrated gripping scene, inherent condition parameters of the robot arm and the task are synchronously recorded in the MongoDB database, and are integrated to acquire a demonstrated action sample $D_t(\{\gamma_t\}, g, d)$, $\{\gamma_t\}=\{S_t, P_t\}$. $\{S_t\}$ is the state information data of the six-degree-of-freedom joints; $\{P_t\}$ is an image feature data sequence; g is the state information of the to-be-gripped target object (including the size and distance of the to-be-gripped target object); d is kinetic information of the robot arm (including the mass of robot arm model components, an initial posture of the robot arm model joints) and control parameters.

S103: Construct an inverse reinforcement reward policy network.

In this embodiment, the constructing the inverse reinforcement reward policy network includes:

S1031: Construct the inverse reinforcement reward policy network for fitting and representing a reward.

In this embodiment, the inverse reinforcement reward policy network is a deep neural network (DNN), which is used to fit and represent a reward function in the GPS algorithm, so as to avoid manual selection of feature parameters for modeling.

In this embodiment, the structure of the inverse reinforcement reward policy network used is as follows:

TABLE 2

| No. | Name | Parameter |
|---|---|---|
| 1 | Input | 40-dimensional feature vector |
| 2 | Fully connected 1 | 50 |
| 3 | Fully connected 2 | 30 |
| 4 | Fully connected 3 | 12 |

Then, an initial value $\theta_0$ of the weight parameter of the inverse reinforcement reward policy network is generated by a uniform random means. At this time, the DNN can be used to represent a reward function that is not optimized by learning and training.

S1032: Generate a simulation parameter through a simulation domain randomization algorithm.

First, a feasible parameter domain C is set to indicate a possible range of a parameter of the domain randomization algorithm. The parameter domain C includes a feasible parameter domain $C_g$ of a relevant parameter of the to-be-gripped target object 3 and a feasible parameter domain $C_d$ of a relevant kinetic parameter of the UR5 robot arm 6.

Specifically, the Ubuntu system is installed on a training machine with a GTX1080 graphics card, and the Docker container built in the Jetson TX1 control board 9 is transplanted. Meanwhile, a real model of the UR5 robot arm 6 and an abstract model of the to-be-gripped target object 3 are imported into the ROS in the training machine. Through the domain randomization algorithm, the initial state of the UR5 robot arm 6 and the size and spatial position of the to-be-gripped target object 3 are randomly generated, and a shooting and observation angle of view in the simulation environment is determined.

In this embodiment, the parameters used in the domain randomization algorithm are as follows:

TABLE 3

| No. | Name | Parameter | Parameter domain |
|---|---|---|---|
| 1 | Mass of robot arm model component | $M^i_{Link}$ (i = 1, 2, . . . , 6) | $[M_{min}, M_{max}]_{kg}$ |
| 2 | Initial posture of robot arm model joint | $\beta_i$ (i = 1, 2, . . . , 6) | $[\beta_{min}, \beta_{max}]_{rad}$ |
| 3 | Initial damping coefficient | $D^i_{Joint}$ (i = 1, 2, . . . , 6) | $[D_{min}, D_{max}]$ |
| 4 | Size of to-be-gripped target object | ObjectSize(1 × 1 × 1) | $[L_{min}, L_{max}]_m$ |
| 5 | Main window angle | Vpangle | $[\alpha_{min}, \alpha_{max}]$ |
| 6 | Distance of to-be-gripped target object | Location | $[X_{min}, X_{max}]_m$ |
| 7 | Gain factor of controller | Gain | $[G_{min}, G_{max}]$ |
| 8 | Time step | T | $[T_{min}, T_{max}]_{s-1}$ |

Then, a set of parameters ($M_{link}{}^i$, $\beta_i$, $D_{Joint}{}^i$, ObjectSize, Vpangle, Location, Gain, T) of the domain randomization algorithm are randomly generated in the parameter domain C, where g(ObjectSize,Vpangle,Location), $d(M_{link}{}^i, D_{Joint}{}^i,$ Gain,T), and state $S(\beta_i)$.

S1033: Program and simulate a virtual gripping action by using an ROS programming library, and obtain a simulated gripping path through sampling.

Based on the parameters of the domain randomization algorithm, the task object, initial state and execution conditions in the simulation environment are set. The ROS programming library is used to program and simulate the gripping action in the simulation environment, and the simulated gripping action path is sampled to acquire simulated gripping path state data. Meanwhile, according to the main window angle parameter Vpangle, the observation angle in the simulation is adjusted, and continuous image sampling is performed to acquire image data of the simulated gripping scene.

The simulated gripping path state data, the image data of the simulated gripping scene and the parameters of the domain randomization algorithm are combined to generate single action sample data $Z_t(\{\gamma_t'\}, g', d')$, which is to be saved in the MongoDB database. $\{\gamma_t'\}=\{S_t', P_t'\}$, where $\{S_t'\}$ is the state information data of the six-degree-of-freedom joints; $\{P_t'\}$ is an image feature data sequence; g' is the state information of the to-be-gripped target object (including the size and distance of the to-be-gripped target object); d' is kinetic information of the robot arm (including the mass of the robot arm model component, the initial posture of the robot arm model joint) and control parameters.

S1034: Subject the inverse reinforcement reward policy network to a simulation pre-training.

The inverse reinforcement reward policy network is pre-trained by using the simulated action sample data $Z_t(\{\gamma_t'\}, g', d')$.

First, the initial value θ of the weight parameter of the randomly generated inverse reinforcement reward policy network is taken as an initial value for iteration, that is, $\theta^1$=initial_weights( )=$\theta_0$.

An iterative loop is started, and a loop feature quantity n is executed from 1 to an upper limit of iteration n max:

The current network weight parameter $\theta^n$ of an n-th loop and the spatial image feature F are input to calculate a current reward distribution as follows:

$\gamma^n$=nn_forward(F, $\theta^n$)

Then, according to the current reward distribution, a Markov decision process (MDP)-based optimal policy $\pi^n$ is calculated:

$\pi^n$=solve_mdp($\gamma^n$)

An expected state frequency $IE[\mu^n]$ and an expert demonstration loss $L_D$ are calculated, where D indicates the demonstration data as an expert action;

$IE[\mu^n]$=propagrate_policy($\pi^n$)

$L_D{}^n$=log($\pi^n$)×$\mu_D{}^a$

A derivative $$\frac{\partial L_D^n}{\partial \gamma^n}$$

of the expert demonstration loss function to the reward r and a derivative $$\frac{\partial L_D^n}{\partial \theta_D^n}$$

of the expert demonstration loss function to the network model parameter are calculated, where $\mu_D$ is an expert state action frequency:

$$\frac{\partial L_D^n}{\partial r^n} = \mu_D - IE[\mu^n]$$

$$\frac{\partial L_D^n}{\partial \theta_D^n} = \text{nn\_backprop}\left(\frac{\partial L_D^n}{\partial \gamma^n}\right)$$

The network model parameter is corrected according to the $$\frac{\partial L_D^n}{\partial \theta_D^n}$$

gradient, and a single iterative optimization is completed:

$$\theta^{n+1} = \text{update\_weights}\left(\theta^n, \frac{\partial L_D^n}{\partial \theta_D^n}\right)$$

The algorithm is iterated to a maximum number of iterations or until the expert demonstration loss $L_D$ is less than a tolerable limit, and the network converges to obtain $\theta_{end}$. Using this parameter as the network weight parameter, the reward policy network guides the robot arm model to execute an execution policy similar to an expected policy programmed by the ROS programming library in the simulation environment.

S104: Subject the inverse reinforcement reward policy network to a transfer training.

First, the weight parameter $\theta_{end}$ of the inverse reinforcement reward policy network pre-trained in S103 is used as an initial condition, and the demonstrated action sample $D_t(\{\gamma_t\}, g, d)$ acquired in S102 is used to replace the programmed and simulated action sample data $Z_t(\{\gamma_t'\}, g', d')$ in S103. In this way, the inverse reinforcement reward policy network is trained, and a network training correction is performed, so as to realize the transfer from a simulation environment model to a real policy model.

Specifically, let $\theta=\theta_{end}$. Based on the demonstrated sample data as the expert action, the image feature vector of the real scene calculated by the visual feature extraction network is used as a feature input to perform the transfer training optimization on the inverse reinforcement reward policy network. The specific algorithm execution step is the same as the optimization process in S1034, and an optimized network weight $\theta_{end}*$ is acquired.

Then, the inverse reinforcement reward policy network acquired through the network weight parameter $\theta_{end}*$, which is a GPS-based reward network with human policy perception, is used to evaluate the reward of the robot arm policy, and guide the robot arm to make a decision similar to human perception in a task in the complex agricultural environment.

S105: Acquire, based on a visual feature extraction network and the inverse reinforcement reward policy network, a forward-guided programming result by using the GPS algorithm.

Based on the visual feature extraction network and the inverse reinforcement reward policy network trained by the learning algorithm, the GPS algorithm is used for forward-guided programming.

The specific guided programming process is as follows:

First, multiple differentiated dynamic programming (DDP) policies (DDP)$\pi_{g_1}, \ldots, \pi_{g_n}$ are generated.

Then, policy path data $\zeta_1, \ldots, \zeta_m$ is acquired by sampling the multiple DDP policies, and average policies are calculated by $$q(\varsigma) = \frac{1}{n}\sum_i \pi_{g_i}(\varsigma)$$

and combined for simultaneous guiding, so as to improve efficiency.

Maximum likelihood estimation is performed on the parameters of these policies, $\theta^* \leftarrow \arg\max_\theta \Sigma_i \log \pi_{\theta*}(\zeta_i)$.

$\pi_{g_1}, \ldots, \pi_{g_n}$ and $\pi_{\theta*}$ are combined to acquire an initial sample set S.

Based on the vector state parameters after scene feature extraction, the inverse reinforcement reward policy network is used to evaluate the sample set S, and rewards of $\pi_{g_1}, \ldots, \pi_{g_n}$ and $\pi_{\theta*}$ are evaluated.

If the reward of $\pi_{g_i}$ is greater than that of $\pi_{\theta*}$, then $\pi_{g_i}$ is assigned to $\pi_{\theta*}$, and the regular parameter in the policy function is reduced correspondingly.

If the reward of $\pi_{g_i}$ is less than that of $\pi_{\theta*}$, then the regular parameter in the policy function is increased.

The evaluation of $\pi_{g_1}, \ldots, \pi_{g_n}$ is repeated to finally acquire a guided optimal policy, which is the forward-guided programming result.

The method of the present invention is based on double servo drives of motion vision to train the robot to obtain intelligent spatial perception and task programming capabilities through an adaptive learning algorithm. In the final drive process, there is no need for precise spatial calibration on the to-be-gripped target object and the related environment in the scene. The robot arm is guided to complete the gripping task according to the trained networks, which have low requirements for space perception equipment, high environmental adaptability, and can be applied to a variety of tasks.

The above disclosed are merely two specific embodiments of the present invention, and the embodiments of the present invention are not limited thereto. Any changes that can be conceived by those skilled in the art should fall within the protection scope of the present invention.

Those of ordinary skill in the art may understand that all or some of the procedures in the methods of the above embodiments may be implemented by a computer program instructing related hardware. The program may be stored in a computer readable storage medium. When the program is executed, the procedures in the embodiments of the above methods may be performed. The storage medium may be a magnetic disk, an optical disk, a read-only memory (ROM) or a random access memory (RANI), etc.

What is claimed is:

1. A device for collaborative servo control of motion vision of a robot in an uncalibrated agricultural scene, comprising: a robot arm, a to-be-gripped target object, an image sensor and a control module, wherein
    an end of the robot arm is provided with a mechanical gripper;
    the to-be-gripped target object is within a grip range of the robot arm;
    the control module is electrically connected to the robot arm and the image sensor, respectively;
    the control module drives the mechanical gripper to grip the to-be-gripped target object, and controls the image sensor to perform image sampling on a process of gripping the to-be-gripped target object by the robot arm; and
    the image sensor sends sampled image data to the control module, wherein the control module is configured to:
        construct a scene space feature vector acquisition network for acquiring a scene feature, the scene space feature vector acquisition network being pre-trained; and
        simulate gripping through a domain randomization algorithm in a simulation environment to create simulation data.

2. The device according to claim 1, wherein the robot arm is a six-degree-of-freedom robot arm.

3. The device according to claim 1, wherein the control module is further configured to:
    use the simulation data to pre-train an inverse reinforcement reward policy network.

4. The device according to claim 3, wherein the control module is further configured to:
    based on the pre-trained networks, obtain a programming result through a guided policy search (GPS) algorithm.

5. A method for collaborative servo control of motion vision of a robot in an uncalibrated agricultural scene, comprising:
    constructing a scene space feature vector acquisition network, and acquiring a scene space feature vector;
    acquiring a demonstrated action sample;
    constructing an inverse reinforcement reward policy network;
    subjecting the inverse reinforcement reward policy network to a transfer training; and acquiring, based on a visual feature extraction network and the inverse reinforcement reward policy network, a forward-guided programming result by using a guided policy search (GPS) algorithm.

6. The method according to claim 5, wherein the scene space feature vector acquisition network is a vision-based convolutional neural network.

7. The method according to claim 3, wherein the step of acquiring the scene space feature vector comprises:
performing, by an image sensor, image sampling on a process of gripping a to-be-gripped target object by a robot arm, and extracting red, green and blue (RGB) image information; and
inputting the RGB image information into the scene space feature vector acquisition network to output the scene space feature vector.

8. The method according to claim 5, wherein the step of acquiring the demonstrated action sample comprises:
pulling a robot arm to complete gripping a to-be-gripped target object, and acquiring demonstrated gripping action data of a single demonstrated gripping;
driving the robot arm to simulate the demonstrated gripping action data and autonomously complete an action of gripping the to-be-gripped target object, and acquiring image feature data of a demonstrated gripping scene through shooting; and
integrating the demonstrated gripping action data and the image feature data of the demonstrated gripping scene to obtain the demonstrated action sample.

9. The method according to claim 5, wherein the step of constructing the inverse reinforcement reward policy network comprises:
constructing the inverse reinforcement reward policy network for fitting and representing a reward;
generating a simulation parameter through a simulation domain randomization algorithm;
programming and simulating a virtual gripping action by using a robot operating system (ROS) programming library, and obtaining a simulated gripping path through sampling; and
subjecting the inverse reinforcement reward policy network to a simulation pre-training.

10. The method according to claim 5, wherein the transfer training of the inverse reinforcement reward policy network comprises:
performing optimization training on the inverse reinforcement reward policy network by using the demonstrated action sample.

\* \* \* \* \*